United States Patent
Tokuchi

(10) Patent No.: US 10,817,147 B2
(45) Date of Patent: Oct. 27, 2020

(54) INFORMATION PROCESSING DEVICE, NON-TRANSITORY COMPUTER READABLE MEDIUM, AND INFORMATION PROCESSING METHOD

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 37 days.

(21) Appl. No.: 15/953,504

(22) Filed: Apr. 16, 2018

(65) Prior Publication Data
US 2019/0179502 A1    Jun. 13, 2019

(30) Foreign Application Priority Data

Dec. 13, 2017 (JP) ................. 2017-238284

(51) Int. Cl.
*G06F 3/0484* (2013.01)
*G06F 40/103* (2020.01)
*G06F 40/106* (2020.01)
*G06F 40/109* (2020.01)
*G06F 40/279* (2020.01)
*H04L 12/58* (2006.01)

(52) U.S. Cl.
CPC .......... *G06F 3/0484* (2013.01); *G06F 40/103* (2020.01); *G06F 40/106* (2020.01); *G06F 40/109* (2020.01); *G06F 40/279* (2020.01); *H04L 51/22* (2013.01)

(58) Field of Classification Search
CPC .. G06F 3/0484; G06F 17/214; G06F 17/2765; G06F 40/103; G06F 40/106; G06F 40/109; H04L 51/22
See application file for complete search history.

(56) References Cited

U.S. PATENT DOCUMENTS

| | | | | |
|---|---|---|---|---|
| 2008/0102863 | A1* | 5/2008 | Hardy | G06Q 10/107 455/466 |
| 2016/0343160 | A1* | 11/2016 | Blattner | G06T 13/40 |
| 2017/0272264 | A1* | 9/2017 | Chang | H04L 12/1827 |
| 2017/0285880 | A1* | 10/2017 | Yang | G06F 3/0481 |
| 2017/0336959 | A1* | 11/2017 | Chaudhri | G06F 3/04817 |
| 2018/0054414 | A1* | 2/2018 | LeVasseur | G06F 21/445 |

FOREIGN PATENT DOCUMENTS

JP    2017-156906    9/2017

OTHER PUBLICATIONS

Broida, "How to increase the font size in iOS", (Oct. 3, 2012), URL: https://www.cnet.com/news/how-to-increase-the-font-size-in-ios/, p. 1-3 (Year: 2012).*
Lync 2013, "Search for messages in or across chat rooms", (2013), URL: https://support.office.com/en-ie/article/search-for-messages-in-or-across-chat-rooms-3e27dd00-2b80-419f-a8cd-455b872d9d50, p. 1-4 (Year: 2013).*

* cited by examiner

*Primary Examiner* — Ajay M Bhatia
*Assistant Examiner* — Mong-Shune Chung
(74) *Attorney, Agent, or Firm* — JCIPRNET

(57) ABSTRACT

An information processing device includes a changing unit that changes, according to an instruction from a user, display of information on a specific conversation participant in a conversational interface. In a further modification of the invention, the changing unit may change a display position or a display form of information on a conversation participant designated as the specific conversation participant by the user.

23 Claims, 13 Drawing Sheets

FIG.1
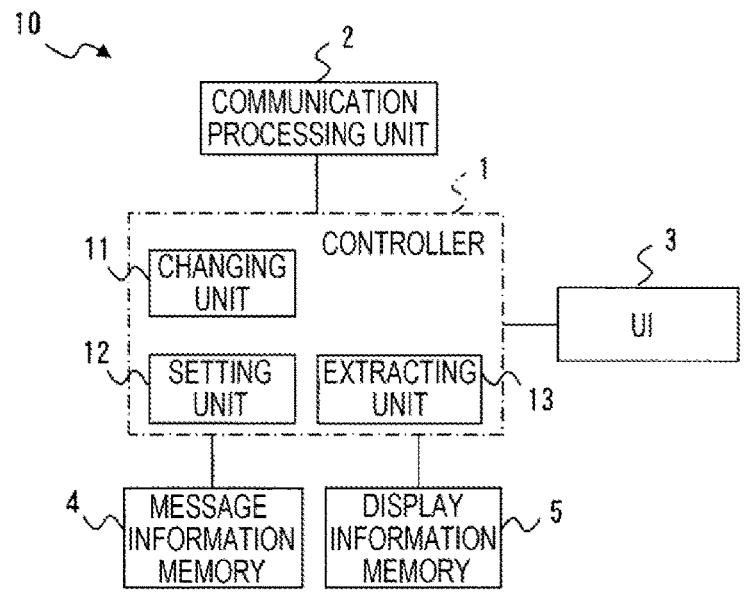
FIG.2
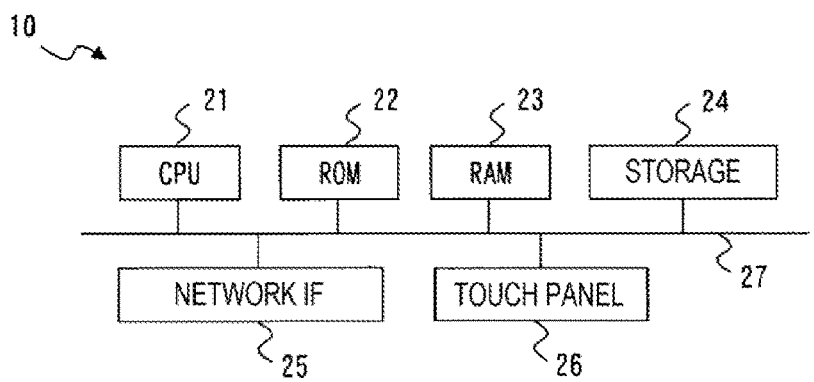
FIG.3
DISPLAY INFORMATION
| SETTING TARGET | SETTING CONTENTS | APPLICATION TARGET TALK ROOM |
|---|---|---|
| IMAGE/CONVERSATION PARTICIPANT NAME/ MESSAGE | • DISPLAY POSITION<br>• SIZE/SHAPE OF IMAGE<br>• SIZE/FONT/DISPLAY COLOR OF CHARACTERS | INDIVIDUAL/CONVERSATION GROUP/ CONVERSATION PARTICIPANT GROUP |

FIG.11

```
┌─────────────────────────────────┐
│         SEARCH SCREEN           │
├─────────────────────────────────┤
│                                 │
│  CONVERSATION  ┌──────────┐     │
│  PARTICIPANT:  └──────────┘     │
│                                 │
│  KEYWORD:      ┌──────────┐     │
│                └──────────┘     │
│                ┌──────────┐     │
│  SEARCH        └──────────┘     │
│  RANGE:        ┌──────────────┐ │
│                │ALL TALK ROOMS│ │
│                │DESIGNATE TALK ROOM│
│                └──────────────┘ │
│                                 │
│                                 │
│                                 │
│     PRESS "SEARCH" BUTTON IF    │
│     CONDITIONS ARE DETERMINED.  │
│            [SEARCH]             │
└─────────────────────────────────┘
```

INFORMATION PROCESSING DEVICE, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2017-238284 filed Dec. 13, 2017.

BACKGROUND

(i) Technical Field

The present invention relates to an information processing device, a non-transitory computer readable medium, and an information processing method.

(ii) Related Art

In general, a user of a mobile terminal such as a smartphone conducts a conversation with a user of another mobile terminal by exchanging a message through a text chatting function of a messaging application typified by LINE (registered trademark).

On the screen (talk room) provided by the messaging application, messages posted by the user of the own mobile terminal are displayed at the right side, and messages posted by the conversation partner are displayed at the left side. In addition, the messaging application provides a group talk function for plural members. On the group talk room, messages posted by the user of the own mobile terminal are aligned and displayed at the right side of the screen as illustrated in FIG. 16, as in the talk room described above which is not the group talk room. Meanwhile, messages posted by the group members other than the user of the own mobile terminal are constantly displayed at the left side of the screen.

SUMMARY

According to an aspect of the invention, an information processing device includes a changing unit that changes, according to an instruction from a user, display of information on a specific conversation participant in a conversational interface.

BRIEF DESCRIPTION OF THE DRAWINGS

Exemplary embodiments of the present invention will be described in detail based on the following figures, wherein:

FIG. 1 is a block diagram illustrating a configuration of a smartphone according to an exemplary embodiment of the invention;

FIG. 2 is a view illustrating an example of a hardware configuration of the smartphone according to the exemplary embodiment;

FIG. 3 is a view illustrating an example of a data structure of display information set in a display information memory according to the exemplary embodiment;

FIG. 11 is a view illustrating an example of display of a search screen according to the exemplary embodiment;

DETAILED DESCRIPTION

Figure 4:
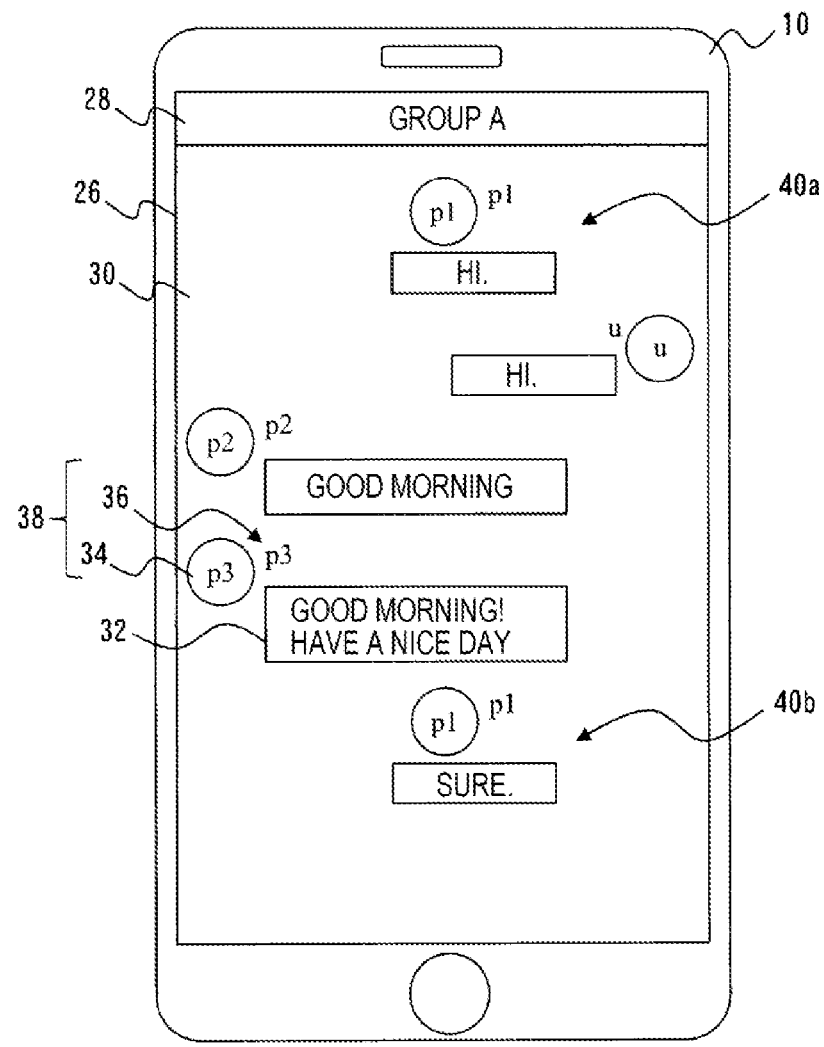
FIG. 4 is a view illustrating an example of a talk room displayed by a messaging application according to the exemplary embodiment.

Hereinafter, exemplary embodiments of the present invention will be described based on the accompanying drawings.

FIG. 1 is a block diagram illustrating a configuration of a smartphone according to an exemplary embodiment of the invention. A smartphone 10 according to the present exemplary embodiment is an example of an information processing device according to an exemplary embodiment of the invention. As described later, functions provided by the present exemplary embodiment are implemented by executing a messaging application. For example, any device such as a tablet terminal may be used without being limited to the smartphone 10 as long as the device is capable of executing the messaging application. The messaging application executed in the present exemplary embodiment may be implemented by adding functions which will be described later, to an existing messaging application, or may be newly created. In the present exemplary embodiment, descriptions will be made assuming that the former messaging application is used, in order to facilitate the understanding of the features of the present exemplary embodiment. The smartphone 10 enables a user to make a conversation with a user of another information processing device in which the messaging application is installed, by exchanging messages with the user of the another information processing device via a network (not illustrated).

FIG. 2 is a view illustrating an example of a hardware configuration of the smartphone 10 according to the present exemplary embodiment. In the present exemplary embodiment, the smartphone 10 may be implemented by an existing general-purpose hardware configuration. That is, the smartphone 10 has a computer incorporated therein and includes, as illustrated in FIG. 2, a CPU 21, a ROM 22, a RAM 23, a storage 24, a network interface (IF) 25 provided as a communication unit, and a touch panel 26 having an input/output unit, which are connected to an internal bus 27.

Referring back to FIG. 1, in the present exemplary embodiment, the smartphone 10 includes a controller 1, a communication processing unit 2, a user interface (UI) 3, a message information memory 4, and a display information memory 5. FIG. 1 omits the illustration of the components which are not used in the descriptions of the present exemplary embodiment.

The communication processing unit 2 operates in cooperation with the network interface 25 and performs a data communication with another information processing device via a network (not illustrated). The messaging application is installed in the other information processing device as in the smartphone 10 according to the present exemplary embodiment, and the another information processing device performs transmission/reception of a message with the smartphone 10. The user interface 3 operates in cooperation with the touch panel 26 and receives an operation to display a screen on the touch panel 26 or an input operation with respect to a displayed screen.

The controller 1 controls the operations of the other components. Especially, when the messaging application is activated, the controller 1 according to the present exemplary embodiment controls the execution of the messaging application. The controller 1 includes a changing unit 11, a setting unit 12, and an extracting unit 13 that implement the functions provided by the messaging application.

The changing unit 11 changes, according to an instruction from the user, the display of information on a specific conversation participant in a conversational interface. The target to be changed is at least one of a display position or a display form of the information on the specific conversation participant. The conversational interface corresponds to, for example, a screen (talk room) provided by the messaging application having the text chatting function. The "talk room" is a screen on which information on a conversation participant such as a series of talk contents (messages posted in the talk room) is displayed with the text chatting function (also called a "talk function") of the messaging application. While the talk room is a screen used for a conversation between conversation participants, the "talk room" may refer to a talk room including the talk contents. In addition, the "conversation participants" refer to persons who post messages in the talk room. The conversation participants include the user of the smartphone 10 and a conversation partner who exchanges messages with the user. When there is one partner who makes a conversation with the user, the number of the conversation participants is two. In addition, in a group talk to which plural conversation participants belong, all group members correspond to the conversation participants. Strictly speaking, a member who does not post a message may be regarded as not corresponding to a conversation participant because the member has not yet participated in the talk. However, here, descriptions will be made assuming that all the group members correspond to the conversation participants. In the descriptions hereinafter, among the conversation participants, the user of the smartphone 10 will be referred to as the "user" or "own conversation participant," and a conversation participant other than the user will be referred to as a "conversation partner." The "specific conversation participant" refers to a conversation participant specified according to an operation instruction from the user, in other words, a conversation participant designated as a specific conversation participant by the user.

In the present exemplary embodiment, descriptions will be made assuming that all messages are posted in a text format in the talk room. However, the messages do not exclude messages posted by voice. In addition, the conversation partner may be not only a user of another smartphone but also a Bot. The "Bot" refers to an application or a program for automating a certain task or processing.

The setting unit 12 sets the specific conversation participant according to an operation instruction from the user. Further, the setting unit 12 causes the user to set a display position of information on the specific conversation participant set by the user. In addition, in the present exemplary embodiment, each group is provided with a function of dividing the conversation participants into groups and changing a display position of information on the conversation participants. In this case, the setting unit 12 causes the user to set the groups. As described in detail later, the extracting unit 13 extracts a message matching a search condition designated by the user or a pair of a question message and an answer message to the question.

A message is exchanged with another smartphone via the communication processing unit 2 under the control of the controller 1. The information on the exchanged message is accumulated in the message information memory 4. The information on the message includes, for example, message transmission or reception date and time, information on a person who posts the message (a conversation participant), and identification information of the displayed talk room (e.g., a name of the group talk room). The "information on a conversation participant" includes identification information of the conversation participant and a message posted by the conversation participant. The identification information of the conversation participant includes information for identifying the conversation participant displayed in the talk room, and corresponds to, for example, an image and a name of the conversation participant which are registered by the conversation participant in the messaging application or the smartphone 10. The identification information of the conversation participant displayed in the talk room depends on a type of the messaging application or the talk room (for one-to-one conversation or a group talk).

FIG. 3 is a view illustrating an example of a data structure of display information set in the display information memory 5 according to the present exemplary embodiment. The display information is information to which the controller 1 refers when displaying, for example, a message in the talk room based on the information on messages stored in the message information memory 4. In the present exemplary embodiment, as described in detail later, a display position or a display form of at least one of an image, a name, or a message of a conversation participant which are included in the information on a conversation participant is changed. When the display of the information described above is changed according to an instruction from the user, the contents of the change are set as the display information by the setting unit 12.

The display information includes items such as a setting target, setting contents, and an application target talk room. The setting target includes information for identifying information on a conversation participant, which is to be set (to be changed). That is, one of an image, a name, and a message of a conversation participant is set. The setting contents include contents for the setting target. For example, when a display position is set to be changed, information for determining the display position is set. For example, when the previous position of display along the left side of the screen is set as the initial position, a movement direction and a movement amount from the initial position are set as information for determining the display position. Alternatively, the screen may be expressed as a two-dimensional coordinate space, and the display position may be set using coordinate data. For example, a difference from the coordinate value of the initial position is set. In addition, when the display form is set to be changed, for example, in a case where the setting target (a target to be changed) is an image, at least one of a size or a shape of the image is set. When the setting target (target to be changed) is a character string such as a conversation participant name or a message, at least one of a size, a font, or a display color of the characters is set. In addition, other setting items may be set. In the application target talk room, a talk room to which the corresponding setting contents are applied is set.

The respective components 1 to 3 of the smartphone 10 are implemented by a cooperative operation between the computer equipped in the smartphone 10 and programs operated by the CPU 21 equipped in the computer. In addition, each of the memories 4 and 5 is implemented by the storage 24 equipped in the smartphone 10. Alternatively, the RAM 23 or an external memory may be used via a network.

In addition, the programs used in the present exemplary embodiment may be provided by a communication unit or may be provided in a state of being stored in a computer-readable recording medium such as a connectable external memory. The programs provided from the communication unit or the recording medium are installed in the computer and sequentially executed by the CPU 21 of the computer so that various processes are implemented.

Next, operations in the present exemplary embodiment will be described.

FIG. 4 is a view illustrating an example of display of a talk room displayed by the messaging application according to the present exemplary embodiment. The talk room is displayed on the touch panel 26 under the control of the controller 1 according to an operation instruction from the user. FIG. 4 represents a group talk room for plural conversation participants. In the case of the group talk room, a display area 28 at the upper portion of the touch panel 26 displays a group name of the displayed group talk room. In addition, a display area 30 at the lower portion of the touch panel 26 displays a message 32 exchanged in the group talk room, and an image 34 and a conversation participant name 36 which are information for identifying a member (conversation participant) who posts the message 32, as a set in a sequential order. In addition, a posting time of a message is usually displayed together. However, since the posting time is not used for the descriptions of the present exemplary embodiment, FIG. 4 omits the illustration of the posting time. The subsequent drawings used hereinafter for the descriptions of the present exemplary embodiment also omit the illustration of the posting time.

For the sake of convenience, the image 34 is illustrated to depict the conversation P name (e.g., "p1," "p2," or "u"). In addition, the image 34 is initially set to be displayed in a circular shape. The conversation participant name 36 is initially set to be displayed at the inner side of the talk room above the image 34. In addition, since the image 34 and the conversation participant name 36 are usually treated as a set, the image 34 and the conversation participant name 36 may be collectively referred to as conversation participant information 38 when the image 34 and the conversation participant name 36 need not be discriminated from each other.

When the messaging application is activated, the controller 1 reads, for example, a message to be displayed in the talk room designated by the user (the talk room of the group A in the display example of FIG. 4) from the message information memory 4, and causes the user interface 3 (the touch panel 26) to display the message. At this time, the controller 1 determines the display position and the display form of the information on the conversation participant (the message 32, the image 34, and the conversation participant name 36) by referring to the display information. FIG. 4 illustrates an example of the display of the talk room when the display position of the information on the conversation participant (specifically, the information on the conversation participant "p1") is changed.

Figure 16:
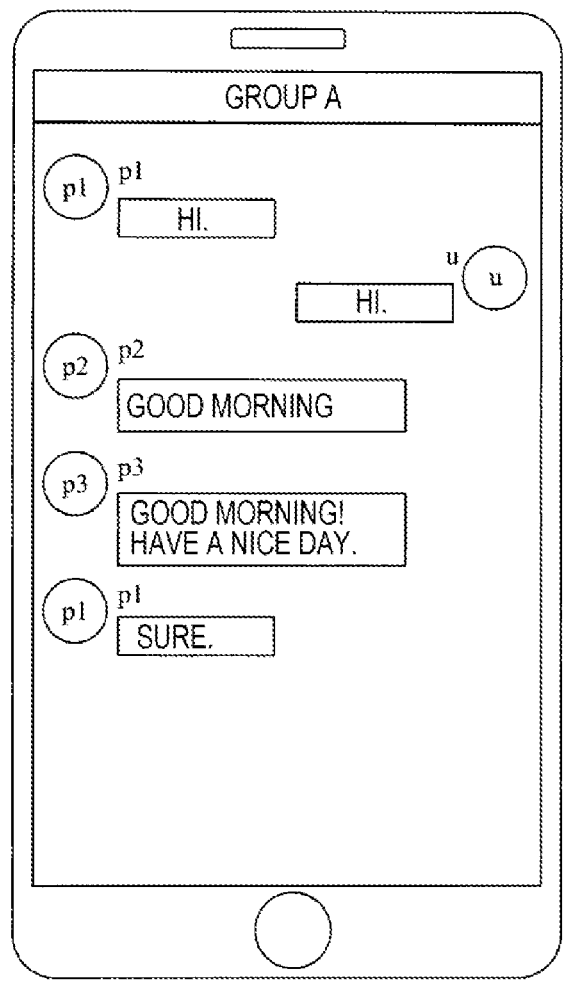
FIG. 16 is a view illustrating an example of display of a talk room displayed by a messaging application.

As apparent from the comparison with the example of the display in FIG. 16, the information (messages or conversation participant information) on the own conversation participant is displayed at the right side of the screen as in FIG. 16. That is, in this example of the display, it may be said that the user has not set a change of the display of the user. Meanwhile, while the messages of the conversation partners are displayed in the sequential order as in the related art, the display position of information 40a and 40b on the conversation participant "p1" is the center of the screen of the touch panel 26, that is, the position along the vertical center line of the screen, rather than along the left side of the screen for the other conversation partners (i.e., "p2" and "p3"). That is, in the display information, the information of the conversation participant "p1" changed to be displayed as illustrated in FIG. 4 is set. The changing unit 11 refers to the display information and changes the display position of the information on the conversation participant "p1" from the left side of the screen to the center of the screen.

In addition, FIG. 16 illustrates the talk room by the messaging application of the related art, and the same display as that in FIG. 16 is performed in the present exemplary embodiment as well unless the display position or the display form of information on a conversation participant is changed.

Here, a method of setting a display position, that is, a method of changing the information on the conversation participant "p1" as illustrated in FIG. 4 will be described.

Figure 5:
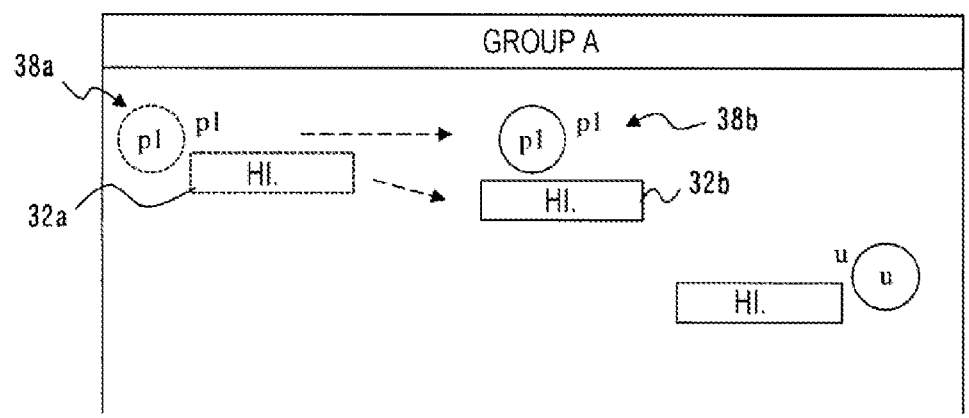
FIG. 5 is a view illustrating a method of setting a display position of information on a conversation participant according to the exemplary embodiment.

FIG. 5 is a view illustrating an example of a method of setting a display position of information on a conversation participant according to the present exemplary embodiment. FIG. 5 represents a part of the display screen (talk room) illustrated in FIG. 4. As illustrated in FIG. 4, when desiring to change the display position of the information on the conversation participant "p1," the user determines the conversation participant "p1" to be subjected to the change of the display position by touching the information on the conversation participant "p1" with the finger. The setting unit 12 sets, as the specific conversation participant, a conversation participant "p1" corresponding to the information on the conversation participant "p1" designated by the user. Then, the user moves the currently displayed conversation participant information 38a on the conversation participant "p1" to a position desired by the user, that is, a position of conversation participant information 38b by performing a dragging operation, and then, takes the finger away from the screen. Similarly, the user moves the currently displayed message 32a to a position desired by the user, that is, a position of a message 32b, and then, takes the finger away from the screen. Strictly speaking, the display area of the message rather than the message itself is moved, but the display area of the message may be simply referred to as the "message" for the convenience of description.

As illustrated in FIG. 5, when the positions of the message 32a and the conversation participant information 38a are changed to positions where the message 32b and the conversation participant information 38b do not overlap with each other in the vertical direction of the screen, the area width required for displaying the message 32b and the conversation participant 38b (the range of the display area in the vertical direction of the screen) becomes larger than the area width required for displaying the message 32a and the conversation participant 38a. However, as illustrated in FIG. 4, the controller 1 controls the display of the information on the conversation participant "p1" so as not to overlap with the information of the other conversation participants and so as to secure the sequential arrangement order.

In addition, the display position may be changed while maintaining the positional relationship between the message 32 and the conversation participant information 38. However, in the present exemplary embodiment, the display position may be individually changed. In addition, in the present exemplary embodiment, the display position of the conversation participant information 38 is changed without changing the positional relationship between the image 34 and the conversation participant name 36. However, the display positions of the image 34 and the conversation participant 36 may be individually changed.

As described above, the display position of the information on the conversation participant in the talk room may be changed. However, according to the example of the display in FIG. 4, there exist two pieces of the information on the conversation participant "p1" to be changed. As in this example, in a case where plural pieces of information on one conversation participant are displayed in the talk room, when the display position of one of the pieces of the information on the conversation participant is changed, the display position of the other pieces of the information on the same conversation participant may be changed in association with the change. That is, as in the example of the display in FIG. 4, when the changing unit 11 changes the display position of information 40a on the conversation participant "p1" to the center of the screen, the changing unit 11 changes the display position of the other information 40b on the conversation participant "p1" in association with the change of the display position of the information 40a.

Figure 6:
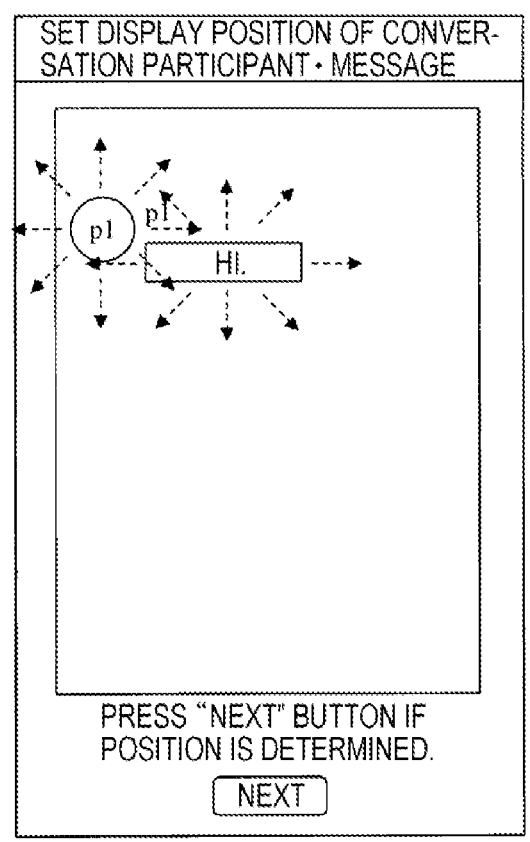
FIG. 6 is a view illustrating another example of the method of setting a display position of information on a conversation participant according to the exemplary embodiment.

FIG. 6 is a view illustrating another example of the method of setting a display position of information on a conversation participant according to the present exemplary embodiment. In FIG. 5, the display position may be changed in the talk room. FIG. 6 illustrates a method of setting a display position on a setting-dedicated screen which is prepared in advance for setting a display position separately from the talk room. For example, the user designates the information on the conversation participant "p1" of which display position is desired to be changed, on the talk room, so that the user determines the conversation participant to be subjected to the change of the display position, and then, causes the setting-dedicated screen to be displayed. Alternatively, to the contrary, the user causes the setting-dedicated screen to be displayed, and then, selects the information on the conversation participant "p1" of which display position is desired to be changed, so that the user determines the conversation participant to be subjected to the change of the display position. The setting unit 12 sets the specific conversation participant according to the user operation.

FIG. 6 represents an example of the display of the setting-dedicated screen after the user operation.

The user moves each of the message 32 and the conversation participant information 38 in the vertical direction, the horizontal direction, or the diagonal direction as indicated by dashed arrows on the setting-dedicated screen different from the talk room. Since the method of moving the message 32 and the conversation participant information 38 has been described using FIG. 5, the descriptions thereof are omitted. However, the setting unit 12 causes the user to set the display position of the information on the conversation participant on the setting-dedicated screen. Then, when the "next" button is pressed, the change of the setting of the display position is confirmed.

As described above, a display position of information on a conversation participant may be changed by using the setting-dedicated screen. When a display position of information on a conversation participant is changed on the setting-dedicated screen, the display positions of all the pieces of information on the conversation participant (e.g., "p1") displayed in one talk room (the group talk room of the group A in the example described above) are changed. In addition, when a display position of information on a conversation participant (e.g., "p1") is changed on the setting-dedicated screen, the application of the change is not limited to the talk room displayed immediately before the change (the group talk room of the group A in the example described above), and the change may be reflected in all talk rooms in which the conversation participant (e.g., "p1") is participating. For example, the user may be caused to select a mode set to reflect the change of the display position on the setting-dedicated screen to only a predetermined talk room or a mode set to reflect the change of the display position to all talk rooms in which the conversation participant is participating.

As described above, when the display position of the information on the conversation participant specified by the selection by the user is set, the setting unit 12 generates display information and sets and registers the display information in the display information memory 5. In the case of the change of the display position as described above, the setting target set in the display information is a message, an image, or a conversation participant name, and the display positions of the respective message, image, and conversation participant are set as the setting contents of the display information. In addition, the application target talk room is the talk room of the group A according to the example described above. In addition, when the change is made using the setting-dedicated screen of FIG. 6, either the talk room of the group A or all talk rooms in which the conversation participant (e.g., "p1") is participating is set as the application target talk room according to the selected mode.

In the case of the group talk room, since messages of conversation participants which are conversation partners of the own conversation participant are constantly displayed at the left side of the screen, it is difficult to grasp a conversation participant from which a message is made. When the present exemplary embodiment is applied, as illustrated in FIG. 4, the information on the conversation participant "p1" may be displayed at the position apart from the left side of the screen, that is, the position deviated from the position of the information on the other conversation partners ("p2" and "p3"), so that it is easy to discriminate the messages of the conversation participant "p1" and the messages of the other conversation partners from each other. That is, the messages of the conversation participant "p1" may be displayed so as to be easily seen among the messages of the conversation partners.

When the display position is changed on the setting-dedicated screen illustrated in FIG. 6, the change may be applied to the talk room displayed immediately before the change or all talk rooms in which the specific conversation participant (the conversation participant designated by the user) is participating. That is, the display position may be changed in either one talk room or all talk rooms. Thus, in the present exemplary embodiment, the display position on one conversation participant may be further set for each group talk room.

Figure 7:
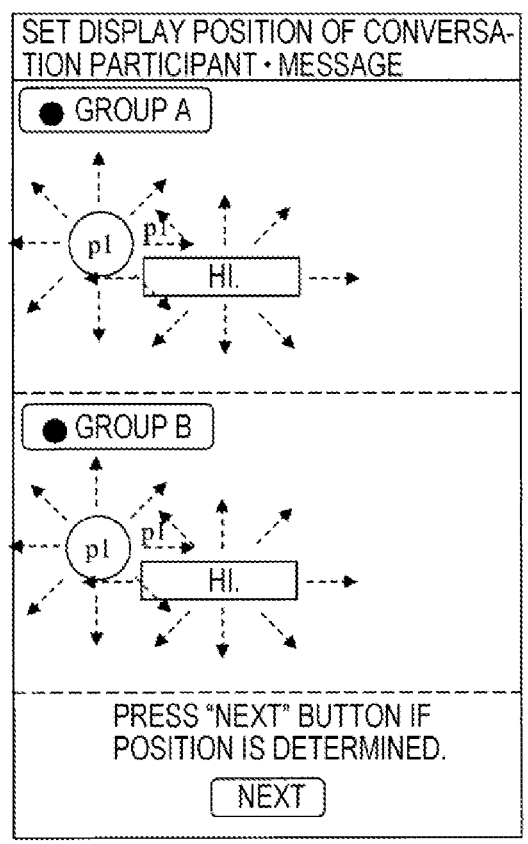
FIG. 7 is a view illustrating an example of a method of setting a display position of information on one conversation participant for each group talk room according to the exemplary embodiment.

FIG. 7 is a view illustrating an example of a method of setting a display position of information on a conversation participant for each group talk room in the exemplary embodiment. As illustrated in FIG. 7, when a conversation participant ("p1" in this example) belongs to plural groups A and B, an area for setting the information on the conversation participant "p1" is provided for each group such that the setting may be performed for each group. In addition, since the method of performing the setting for each group corresponds to the method described above using FIG. 6, descriptions thereof will be omitted.

When the conversation participant is participating in three or more groups, the setting area for each group may be displayed to be scrolled, or the setting areas may be reduced and displayed on one screen.

Figure 8:
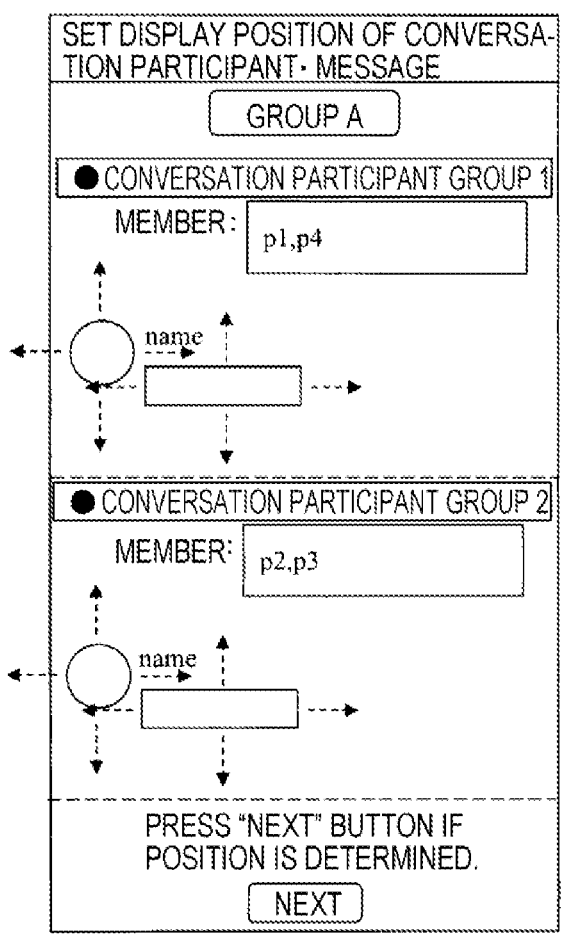
FIG. 8 is a view illustrating another example of the method of setting a display position of information on a conversation participant according to the exemplary embodiment.

FIG. 8 is a view illustrating another example of the method of setting a display position of information on a conversation participant according to the present exemplary embodiment. A group formed of the plural conversation participants belonging to the group talk room described above will be referred to as a "conversation group," and groups formed by dividing the conversation participants of one conversation group into plural groups will be referred to as "conversation participant groups." FIG. 7 represents an example of the display of the setting-dedicated screen for setting a display position of information on one conversation participant for each conversation group. In addition, the conversation group is the same as the group formed of the members of the group talk room. Meanwhile, FIG. 8 represents an example of display on a setting-dedicated screen for setting display positions of information on conversation participants for each conversation participant group in one group talk room. Specifically, in FIG. 8, among the conversation participants belonging to the group A, the conversation participants "p1" and "p4" are grouped into a conversation participant group 1, and the conversation participants "p2" and "p3" are grouped into a conversation participant group 2. Then, display positions of the information on the conversation participants of each conversation participant group are set. In this regard, the method of performing the setting for each conversation participant group may be the method described above using FIG. 6, and thus the description thereof will be omitted here.

When one conversation group is divided into three or more conversation participant groups, the setting area for each conversation participant group may be displayed to be scrolled, or the setting areas may be reduced and displayed on one screen.

Figure 9:
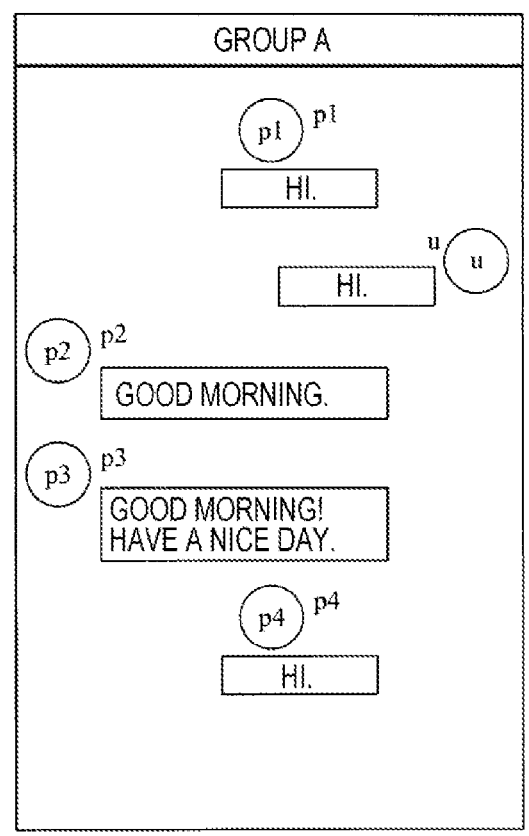
FIG. 9 is a view illustrating an example of display of a talk room when a display position is set for each conversation participant group, according to the exemplary embodiment.

FIG. 9 is a view illustrating an example of display of a talk room when a display position is set for each conversation participant group according to the present exemplary embodiment. FIG. 9 represents an example of display when the conversation participants "p1" and "p4" are grouped into the same conversation participant group, and the conversation participants "p2" and "p3" are grouped into the same conversation participant group. By referring to the display of the group talk rooms, the user may easily discriminate messages in each of the grouped conversation participant groups by himself/herself.

Figure 10:
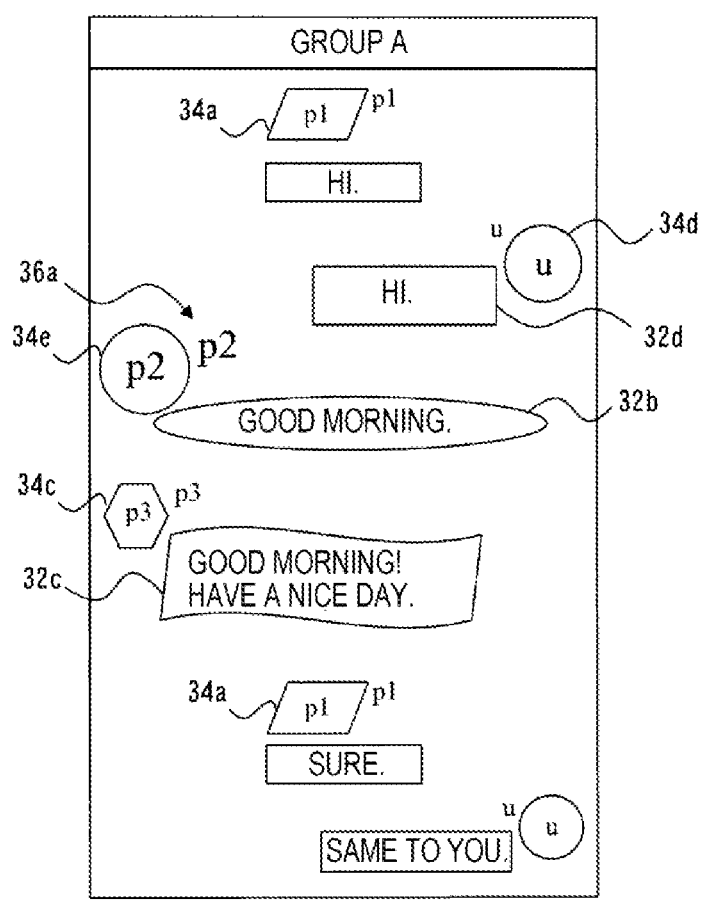
FIG. 10 is a view illustrating another example of display of a talk room displayed by a messaging application according to the exemplary embodiment.

FIG. 10 is a view illustrating another example of display of the talk room displayed by the messaging application according to the present exemplary embodiment. In the descriptions above, the display position of information on a specific conversation participant is changed so that the information on the specific conversation participant is easily discriminated from information on another conversation participant.

In this example, a display form of information on a specific conversation participant is changed so that the information on the specific conversation participant is easily discriminated from information on another conversation participant. FIG. 10 represents an example where the shape of an image 34a of the conversation participant "p1" is changed into a parallelogrammic shape. Further, FIG. 10 represents an example where the shape of the message 32b (e.g., the area for displaying the message) of the conversation participant "p2" is changed into an elliptical shape. Further, FIG. 10 represents an example where the shapes of a message 32c and an image 34c of the conversation participant "p3" are changed into a flag shape and a hexagonal shape, respectively. In this way, the display forms may be changed so that the conversation participants may be easily discriminated from each other.

While FIG. 10 represents an example where the shapes are changed, the display forms to be changed may not be limited to the shapes described above. For example, when information on a conversation participant is an image, at least one of a size or a shape of the image may be changed. Each of images 34d and 34e is an example where the size of the image is changed. The shape of the image used for an image of a conversation participant may be prepared by the user, or an image (a shape thereof) prepared by the smartphone 10 or the messaging application may be used. In addition, when information on a conversation participant is a character string such as a conversation participant name or a message, at least one of a size of a frame (display area) in which the character string is displayed, or a size, a font, or a display color of characters may be changed. A message 32d is an example where the size of the display area of the message is changed to be large. In addition, a conversation participant name 36a is an example where the font is changed to be large.

In addition, while at least one of the display position or the display form may be changed as in the information on the conversation participant "p1" in FIG. 4 or the information on the conversation participants "p2" and "p3" in FIG. 10, both the display form and the display position may be changed as in the information on the conversation participant "p1" in FIG. 10.

When the user changes the display form of information on a conversation participant as illustrated in FIG. 10, the setting unit 12 generates display information including the changed contents and sets and registers the display information in the display information memory 5. When the shape of an image is changed, the setting unit 12 sets and registers the changed image in the setting contents of the display information. Alternatively, information on storage destination of the changed image may be set in the setting contents of the display information such that data indicating the shape of the image may be saved in a location specified by the storage location information. Then, when the talk room is displayed on the screen, the controller 1 reads out information on a conversation participant from the message information memory 4, determines the display position and the display form of the information on the read conversation participant, and causes the user interface 3 to display the information.

As for the change of the display of information on a conversation participant, the above descriptions have shown the function to change the display position or the display form of the information on the conversation participant in the talk room. Hereinafter, a search function provided by the messaging application according to the present exemplary embodiment will be described. As for the search function, the extracting unit 13 extracts a corresponding message, and the changing unit 11 performs display of the extracted message.

FIG. 11 is a view illustrating an example of display of a search screen according to the present exemplary embodiment. The search screen is a screen provided by the search function. In the present exemplary embodiment, as illustrated in FIG. 11, a conversation participant, a keyword, and a search range may be designated as search conditions. For the conversation participant, one or plural conversation participants who post a message desired to be extracted as a search result are set. One or plural keywords are set, which are included in a message desired to be extracted as a search result. For the search range, a talk room to be searched is set. In FIG. 11, an item "all talk rooms" or "designate a talk room" may be selected. When the item "all talk rooms" is selected, all talk rooms registered in the messaging application, that is, all messages are to be searched. When the item "designate a talk room" is selected, a screen for designating one or plural talk rooms to be further searched are displayed, and a talk room to be searched is designated from the screen. For example, all talk rooms registered in the messaging application may be displayed as a list on a submenu screen such that the user may select one or more of the talk rooms or the user may input the name of a talk room.

The user does not need to designate all the settable search conditions, and may set only a desired search condition. When the user sets the search conditions, and then, presses a "search" button at the bottom of the screen, the extracting unit 13 extracts a message matching the search conditions designated by the user from the message information memory 4. Then, the changing unit 11 changes the display of the information on the conversation participant to display only the extracted message from the messages stored in the message information memory 4. In this case, a conversation participant who posts the extracted message corresponds to the specific conversation participant.

In this regard, the search conditions represented in FIG. 11 are merely an example, and search conditions are not limited to the search conditions of FIG. 11. For example, a time range may be designated. In addition, conditions may be set to be excluded from search targets.

Figure 12:
FIG. 12 is a view illustrating an example of display of a search result screen according to the exemplary embodiment.

FIG. 12 is a view illustrating an example of a screen for displaying a search result according to the present exemplary embodiment. FIG. 12 represents an example of a search result obtained when "p2" is designated as the conversation participant and a "group C" is designated as the search range. No keyword is designated. The screen of the search result illustrated in FIG. 12 is different from the talk room in which messages are displayed in the conversation form as described above, and is one of the screens provided by the search function. As illustrated in FIG. 12, on the screen of the search result, the messages posted by the conversation participant "p2" in the group C are listed and displayed in the sequential order. That is, the extracting unit 13 extracts the messages posted by the conversation participant "p2" in the group talk room of the group C from the message information memory 4. As a result, only the messages posted by the specific conversation participant "p2" in the group talk room of the group C may be extracted and displayed.

In addition, instead of using the dedicated search result screen, the search result may be displayed by deleting messages posted by conversation participants other than the conversation participant "p2" from the group talk room of the group C.

Figure 13:
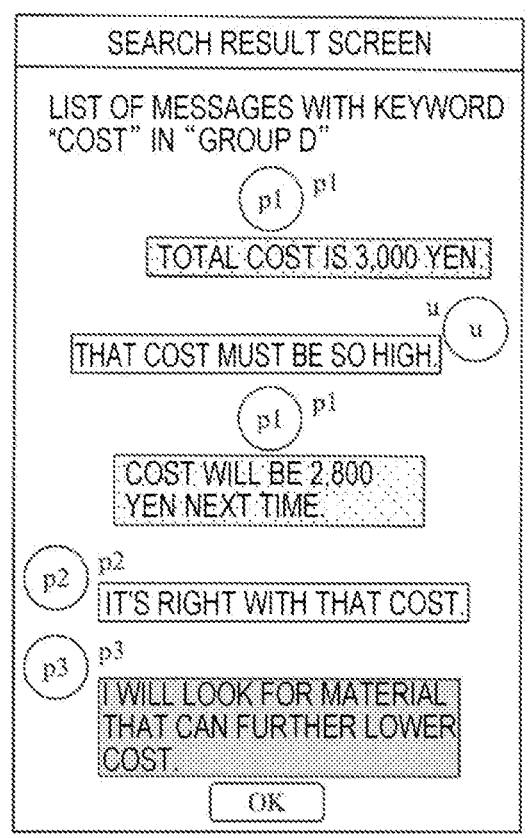
FIG. 13 is a view illustrating another example of display of the search result screen according to the exemplary embodiment.

FIG. 13 is a view illustrating another example of the screen for displaying the search result according to the present exemplary embodiment. FIG. 13 represents an example of a search result obtained when "cost" is designated as the keyword and a "group D" is designated as the search range. No conversation participant is designated. As apparent from the search result screen illustrated in FIG. 13, only messages including the character string "cost" are extracted from the group talk room of the group C and displayed in the sequential order. That is, the extracting unit 13 extracts messages including the characters "cost" in the group talk room of the group D from the message information memory 4.

In addition, the changing unit 11 refers to the display information and changes the display position of the information on the conversation participant "p1" so that the position differs from those of other conversation participants. Further, the display forms of the messages are changed to be different from each other for each conversation participant. FIG. 13 represents an example where a pattern or a display color within a message display area is changed for each conversation participant. In this way, the controller 1 may change the display of information on each conversation participant. That is, the display of information on a conversation participant may be changed by combination of the change of the display position and the change of the display form.

Figure 14:
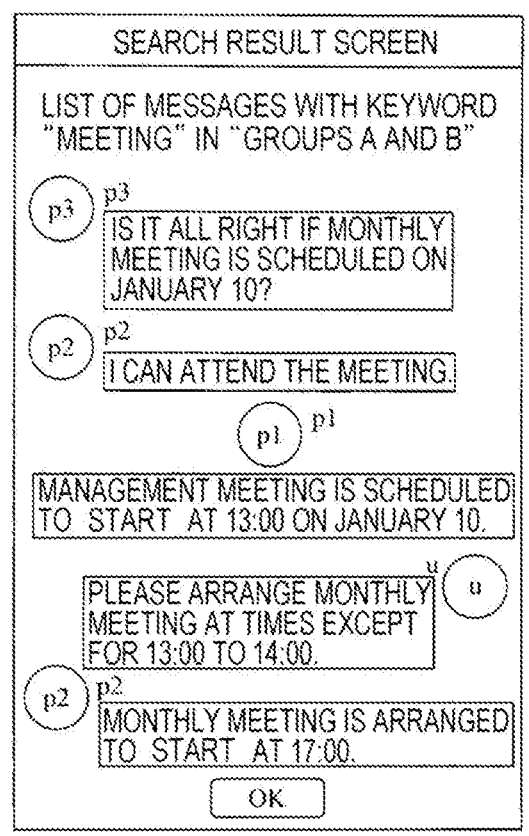
FIG. 14 is a view illustrating another example of display of the search result screen according to the exemplary embodiment.

FIG. 14 is a view illustrating another example of the screen for displaying the search result according to the present exemplary embodiment. FIG. 14 represents an example of a search result obtained when "meeting" is designated as the keyword and "groups A and B" are designated as the search range. No conversation participant is designated. In addition, it is assumed that the conversation participant "p1" and the user belong to the group A, and the conversation participants "p2" and "p3" and the user belong to the group B. That is, the extracting unit 13 extracts messages including the characters "meeting" in the group talk room of the group A and also extracts messages including the characters "meeting" in the group talk room of the group B, from the message information memory 4. As described above, the extracting unit 13 sets, as search targets, messages posted in the plural groups (conversation groups).

In addition, the changing unit 11 refers to the display information and changes the display position of the information on the conversation participants belonging to the group A so that the information is displayed at the center of the screen. In addition, instead of setting the display positions of the respective groups different from each other based on the setting of the display information, the display forms of the groups may be set different from each other so that the messages of the groups are easily discriminated from each other.

As apparent from the search result screen illustrated in FIG. 14, when plural talk rooms are designated as the search conditions, the extracting unit 13 may search across the plural groups and cause the messages posted in the plural talk rooms to be displayed on one screen. That is, the messages posted in the plural talk rooms may be collectively displayed on one screen. In this regard, while it is assumed that the messages extracted from the plural groups are displayed in the sequential order, the exemplary embodiment is not limited thereto. For example, the messages may be collectively displayed for each group.

In the search function described above with reference to FIGS. 11 to 14, messages matching the designated search conditions may be extracted and displayed on one screen. In a search function to be described below, a question message is searched, and a pair of the question message and an answer message to the question are automatically extracted, rather than causing the user to designate the search conditions.

Figure 15:
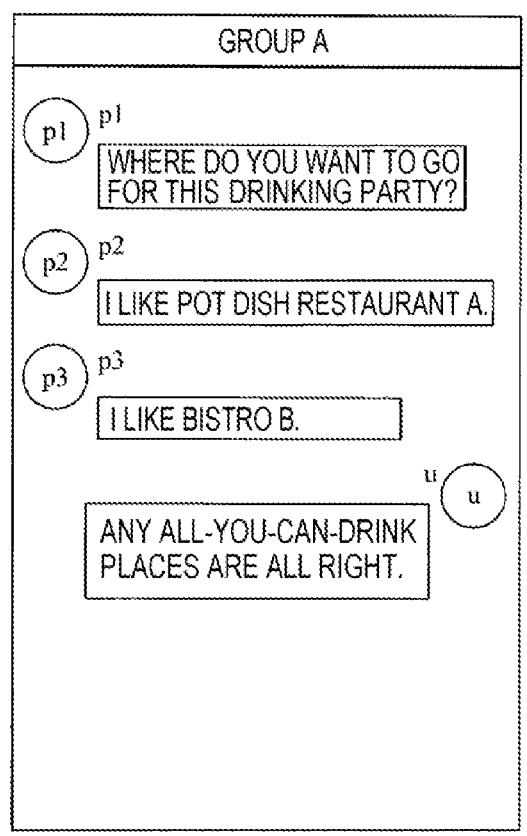
FIG. 15 is a view illustrating an example of display of a screen for displaying extracted Q&A messages according to the exemplary embodiment.

As a combination of a question message and an answer message to the question, so-called Q&A messages may be assumed. FIG. 15 is a view illustrating an example of display of a screen for extracting and displaying Q&A messages according to the present exemplary embodiment. The extracting unit 13 extracts a question message from the message information memory 4. In a case of a conversation in the Q&A form, an inquiry, that is, a question (Q) is a message described in a question form. The question form may be determined by determining whether a message is ended with the question mark "?." That is, the extracting unit 13 extracts a message ended with the question mark "?" as the question message, from the message information memory 4.

Subsequently, by using artificial intelligence (AI) capable of interpreting the meaning of messages, the extracting unit 13 estimates answers A to the question and extracts the answer messages. Alternatively, messages including terms related to the terms included in the question may be extracted as answer messages. FIG. 15 represents an example where messages including terms such as "pot dish," "bistro," and "all-you-can-drink" related to the term "drinking party" included in the question are extracted as answer messages. As for the related terms, a data base may be prepared in advance, or an external database may be used. Alternatively, assuming that a prompt answer is made to the question, a message posted immediately after the question message may be estimated and extracted as an answer message.

In addition, as for the question message, it may be inquired whether to attend an event such as a meeting. In this case, it is highly likely that the answer message includes characters such as "attendance," "non-attendance," "O," "X," "OK," "NG," "all right," or "sorry" to express the attendance/non-attendance. Thus, the characters expressing the attendance/non-attendance are prepared as predetermined characters in advance, and the extracting unit 13 extracts messages including the predetermined characters from the message information memory 4.

In addition, since it may be estimated that a question message and an answer message to the question are basically posted in the same talk room, the search range of the answer message may be set to the same talk room as that of the question message. In addition, depending on the contents of an inquiry, the search range may be set to talk rooms other than the inquired talk room. In addition, by designating the search conditions as described above, question messages to be extracted may be narrowed down. In addition, the display position or form of information on a conversation participant which includes messages displayed on the screen may be changed for each conversation participant.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a processor, configured to:
receive an instruction, from a user, associated with a specific conversation participant among a plurality of conversation participants including the user in a conversational interface; and
in response to the instruction, change a display position of all messages and at least one of a participant name or a participant image corresponding to the specific conversation participant in the conversational interface, such that, all of the messages and at least one of the participant name or the participant image corresponding to the specific conversation participant are aligned with respect to a first vertical axis, while at least one of a participant name or a participant image of information corresponding to another conversation participant among the conversation participants other than the user is aligned with respect to a second vertical axis; and
wherein the first vertical axis is different from the second vertical axis.

2. The information processing device according to claim 1, wherein
in response to the instruction, the processor shifts all the information corresponding to the specific conversation participant by a predetermined amount.

3. The information processing device according to claim 1, wherein
when the information on the conversation participant is an image for identifying the conversation participant, the processor further changes at least one of a size or a shape of the image.

4. The information processing device according to claim 1, wherein
when the information on the conversation participant further includes a character string, the processor changes at least one of a size, a font, or a display color of characters.

5. The information processing device according to claim 1, wherein the processor is further configured to:
set the specific conversation participant according to an instruction from the user.

6. The information processing device according to claim 5, wherein
the processor sets, as the specific conversation participant, a conversation participant corresponding to information on a conversation participant designated by the user on a screen used for a conversation between conversation participants.

7. The information processing device according to claim 6, wherein
the processor changes the display position of information on the specific conversation participant to a position designated by the user on the screen.

8. The information processing device according to claim 5, wherein
the processor causes the user to set the specific conversation participant on a setting screen provided separately from a screen for use in a conversation between conversation participants.

9. The information processing device according to claim 8, wherein
the processor causes the user to set the display position of information on the specific conversation participant set by the user on the setting screen.

10. The information processing device according to claim 8, wherein
when a conversation participant designated as the specific conversation participant by the user belongs to a plurality of conversation groups each with a plurality of conversation participants, the processor causes the user to set at least one of the display position or a display form of information on the specific conversation participant in each conversation group.

11. The information processing device according to claim 8, wherein
the processor causes the user to divide conversation participants belonging to one conversation group into a plurality of conversation participant groups, and to set at least one of the display position or a display form of information on conversation participants for each conversation participant group.

12. The information processing device according to claim 5, wherein
when a plurality of conversation groups each with a plurality of conversation participants are formed, a conversation participant designated as the specific conversation participant in one conversation group by the user is also set as the specific conversation participant in another conversation group by the processor.

13. The information processing device according to claim 1, wherein the processor is further configured to:
extract a message matching a search condition designated by the user when information on a conversation participant is a message posted by the conversation participant, wherein
the processor makes a change to display only the extracted message.

14. The information processing device according to claim 13, wherein
when a conversation participant is designated as the search condition by the user, the processor extracts a message posted by the conversation participant.

15. The information processing device according to claim 14, wherein
when a plurality of conversation groups each with a plurality of conversation participants are formed, the processor sets, as search targets, messages posted in the plurality of conversation groups.

16. The information processing device according to claim 13, wherein
when a keyword is designated as the search condition by the user, the processor extracts a message including the keyword.

17. The information processing device according to claim 16, wherein
the processor changes display of the extracted message for each conversation participant.

18. The information processing device according to claim 1, wherein the processor is further configured to:
extract a pair of a question message and an answer message to the question when information on a conversation participant is a message posted by the conversation participant, wherein
the processor makes a change to display only the pair of the extracted messages.

19. The information processing device according to claim 18, wherein
the processor estimates and extracts, as the question message, a message including a question mark.

20. The information processing device according to claim 18, wherein
the processor estimates and extracts, as an answer message to the question, a message posted immediately after the question message.

21. The information processing device according to claim 18, wherein
the processor estimates and extracts, as the answer message to the question, a message including a predetermined character, among messages continuously posted in response to the question message.

22. A non-transitory computer readable medium storing a program causing a computer to execute information processing, the information processing comprising:
receiving an instruction, from a user, associated with a specific conversation participant among a plurality of conversation participants including the user in a conversational interface; and
in response to the instruction, changing a display position of all messages and at least one of a participant name or a participant image corresponding to the specific conversation participant in the conversational interface, such that, all of the messages and at least one of the participant name or the participant image of the information corresponding to the specific conversation participant are aligned with respect to a first vertical axis, while at least one of a participant name or a participant image of information corresponding to another conversation participant among the conversation participants other than the user is aligned with respect to a second vertical axis; and
wherein the first vertical axis is different from the second vertical axis.

23. An information processing method comprising:
receiving an instruction, from a user, associated with a specific conversation participant among a plurality of conversation participants including the user in a conversational interface; and
in response to the instruction, changing a display position of all messages and at least one of a participant name or a participant image corresponding to the specific conversation participant in the conversational interface, such that, all of the messages and at least one of the participant name or the participant image of the information corresponding to the specific conversation participant are aligned with respect to a first vertical axis, while at least one of a participant name or a participant image of information corresponding to another conversation participant among the conversation participants other than the user is aligned with respect to a second vertical axis; and wherein the first vertical axis is different from the second vertical axis.

* * * * *